United States Patent
Chevillot et al.

(10) Patent No.: US 11,125,318 B2
(45) Date of Patent: Sep. 21, 2021

(54) POWER TRANSMISSION SYSTEM INCLUDING A LUBRICATION OIL RECOVERY DEVICE AND TURBOMACHINE PROVIDED WITH SUCH A POWER TRANSMISSION SYSTEM

(71) Applicant: SAFRAN AIRCRAFT ENGINES, Paris (FR)

(72) Inventors: Fabrice Joel Luc Chevillot, Moissy-Cramayel (FR); Julien Fabien Patrick Becoulet, Moissy-Cramayel (FR); Arnaud Nicolas Negri, Moissy-Cramayel (FR); Emmanuel Pierre Dimitri Patsouris, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 335 days.

(21) Appl. No.: 16/421,140

(22) Filed: May 23, 2019

(65) Prior Publication Data
US 2019/0360578 A1    Nov. 28, 2019

(30) Foreign Application Priority Data
May 28, 2018 (FR) ...................... 1854532

(51) Int. Cl.
*F16H 57/04* (2010.01)
*F16H 1/28* (2006.01)
(Continued)

(52) U.S. Cl.
CPC ......... *F16H 57/0427* (2013.01); *F01D 25/18* (2013.01); *F02C 7/36* (2013.01);
(Continued)

(58) Field of Classification Search
None
See application file for complete search history.

(56) References Cited

U.S. PATENT DOCUMENTS 3,097,546 A * 7/1963 Kelbel .................... F16D 48/02
                                                       475/136
4,530,331 A * 7/1985 Gibson .................... F16H 1/28
                                                       123/450
(Continued)

FOREIGN PATENT DOCUMENTS

| DE | 0376381 C | 5/1923 |
| FR | 3052322 | 12/2017 |
| FR | 3054264 A1 | 1/2018 |

OTHER PUBLICATIONS

Preliminary Research Report and Written Opinion received for French Application No. 1854532, dated Feb. 12, 2019, 10 pages (1 page of French Translation Cover Sheet and 9 pages of original document).

*Primary Examiner* — Colby M Hansen
(74) *Attorney, Agent, or Firm* — Womble Bond Dickinson (US) LLP

(57) ABSTRACT

The invention concerns a power transmission system of a turbomachine, comprising:
- a speed reducer (12) comprising a sun gear (15) rotationally secured to a power shaft (5) with a longitudinal axis, an outer ring gear (18) rotating a rotor shaft along the longitudinal axis, and a planet carrier (17), and
- a device (40) for recovering oil ejected by centrifugal effect and comprising an annular gutter (41) for recovering the ejected oil, the gutter being attached to a fixed annular housing (26) and having a recovery chamber (42) and a first wall portion (43) disposed at least partially facing oil ejection means (30) of the speed reducer for directing the oil to the recovery chamber.

(Continued)

According to the invention, the recovery chamber is provided with an inlet opening (45) directed radially outwardly and defined in a plane radially lower than a plane where an outlet port (33) of the ejection means is defined.

15 Claims, 4 Drawing Sheets

(51) Int. Cl.
    *F01D 25/18*     (2006.01)
    *F02C 7/06*     (2006.01)
    *F02C 7/36*     (2006.01)

(52) U.S. Cl.
    CPC ........... *F16H 1/28* (2013.01); *F16H 57/0423* (2013.01); *F05D 2220/324* (2013.01); *F05D 2260/98* (2013.01)

(56) References Cited

U.S. PATENT DOCUMENTS

| | | | |
|---|---|---|---|
| 2008/0116010 A1* | 5/2008 | Portlock | ............. F16H 57/0479 184/6.12 |
| 2015/0300255 A1 | 10/2015 | Gallet et al. | |
| 2017/0254407 A1 | 9/2017 | Cipolla et al. | |
| 2018/0023483 A1 | 1/2018 | Le Pache et al. | |

* cited by examiner

POWER TRANSMISSION SYSTEM INCLUDING A LUBRICATION OIL RECOVERY DEVICE AND TURBOMACHINE PROVIDED WITH SUCH A POWER TRANSMISSION SYSTEM

1. FIELD OF THE INVENTION

The field of the present invention is that of aeronautical propulsion and more particularly that of turbomachines with rotating parts requiring significant lubrication.

2. BACKGROUND

Some turbomachines, such as dual flow turbine engine or turboprop engine with counter-rotating propellers, are equipped with a power transmission mechanism such as epicyclic gear train differential speed reducer or a planetary gear train speed reducer (known as a "RGB" or "Reduction Gear Box"). Epicyclic gear train differential speed reducers, i.e. wherein all components are movable, are applicable to turboprop engines with twin propellers. Planetary gear reducers, i.e. wherein the planet carrier is fixed and the ring gear is movable, are applicable to a turboprop engine with a single propeller or a dual flow turbine engine equipped with a fan. Examples of power transmission mechanisms are described in US-A1-2017/254407 and FR-A1-3054264. We are particularly interested in the latter case (dual flow turbine engine with fan). In general, a power transmission shaft drives the fan shaft of the dual flow turbine engine or the rotor shaft of the propellers via the speed reducer. Fan shafts or propeller shafts are supported and guided by bearings that include rolling elements such as balls or rollers. Such speed reducers are equipped with several rotating gear wheels and/or pinions whose lubrication is an essential aspect for the proper functioning of the turbomachine and its efficiency. When the speed reducer is not sufficiently lubricated, friction between the teeth of the gear wheels and/or pinions or at the bearings causes premature wear and thus a decrease in the speed reducer's efficiency. These bearings, gear wheels and/or pinions of speed reducers can generate very high thermal power to guarantee good efficiency, which implies the need for a lubrication system designed to send a large oil flow of up to several thousand liters per hour, for example more than 5000 liters per hour to lubricate the speed reducer and the bearings. One of the disadvantages of such a lubrication system is the difficulty of recovering and evacuating such a flow of oil.

The lubrication system consists of one or more housings forming an enclosure in which the speed reducer and bearings are contained. The oil is generally evacuated to the lower part of the enclosure (six o'clock). The enclosure also includes evacuation means such as pipes that return oil back into the lubrication system. In the case of an epicyclic gear train speed reducer, i.e. the sun gear and the planet carrier are rotating while the outer ring gear is fixed, evacuation means are arranged, in a complex manner, in the lower part of the outer ring gear so as to evacuate the oil from the internal parts of the speed reducer towards the lower part of the enclosure. On the other hand, in the case of a planetary speed reducer with the outer ring gear being rotating, the evacuation is more complex. Indeed, during the rotation of the outer ring gear, the oil is projected by centrifugal effect over the entire wall of the enclosure whose volume is quite large. The oil flows by gravity towards the lower part of the enclosure for its evacuation. However, recovery is not fast and efficient due to the high flow of oil moving in the enclosure and in the lubrication system.

Patent No. FR3052322 describes an example of an epicyclic gear train differential speed reducer and an oil recovery device that prevents oil from accumulating in the enclosure by forming accumulation zones and quickly evacuating the oil. The recovery device includes an annular gutter arranged around the outer ring gear of the speed reducer. The gutter includes a recovery chamber and a first portion of wall arranged at least partially facing oil ejection means in order to guide the oil projected onto it towards the oil recovery chamber. The first wall portion is a fin that forms an orifice oriented towards the ejection means. This fin is surrounded by other portions of annular walls forming a bowl and the chamber has a lateral inlet opening through which the oil passes. One of the disadvantages of this gutter is its radial size, which affects the mass of the turbomachine. In addition, this gutter is complex because of its many walls, fins and bowls shaped to avoid oil retention and the guiding of the oil to the recovery chamber, which influences the manufacturing cost and feasibility of the recovery device and the turbomachine.

3. OBJECTIVE OF THE INVENTION

The objective of this invention is in particular to provide an improved recovery system that quickly recovers, contains and evacuates a large oil flow to a lubrication system while being simple in design and reducing the radial size of the gutter.

4. SUMMARY OF THE INVENTION

This objective is achieved in accordance with the invention by means of a power transmission system between a rotor shaft with longitudinal axis X of a turbomachine and a power shaft with longitudinal axis X, the transmission system comprising:
  a speed reducer capable of reducing the speed of the rotor shaft, said speed reducer including a sun gear configured to be rotationally secured with the power shaft, an outer ring gear configured to drive in rotation the rotor shaft along the longitudinal axis X, and a planet carrier,
  a device for recovering oil ejected by centrifugal effect into the turbomachine, the recovery device including an annular gutter intended to recover the oil ejected from the speed reducer, the gutter being configured to be secured to a fixed annular housing surrounding said gutter and including a recovery chamber and a first wall portion disposed at least partially facing oil ejection means of the speed reducer so as to direct the oil projected thereon toward the oil recovery chamber,
  the ring including an annular tab extending outwardly along a radial axis Z perpendicular to the longitudinal axis X and including at least partially the ejection means ejecting the oil from the ring, and the recovery chamber being provided with a radially outwardly oriented inlet opening and defined in a plane radially lower than a plane in which an outlet port of the ejection means is defined.

Thus, this solution makes it possible to achieve the above-mentioned objective. In particular, the position of the recovery chamber makes it possible not to impact the radial size in an enclosure already cluttered with the speed reducer and bearings because the chamber does not extend beyond this outlet port of the speed reducer. In addition, the configuration of the gutter is easy to manufacture and implement while allowing, on the one hand, the relative displacements between the outer ring gear of the speed reducer and the gutter and, on the other hand, efficient oil recovery. Indeed, since the outer ring gear is movable, most of the oil is evacuated from the outer ring gear via the annular tab and by means of centrifugal force with great force. The recovery chamber is therefore as close as possible to the periphery of the outer ring gear of the speed reducer, in particular the annular tab, to reduce the radial size. The outer diameter of the system is reduced while avoiding radial clearance between moving and fixed parts of the system.

According to a characteristic of the invention, the speed reducer is a differential reducer or a planetary reducer.

According to another characteristic of the invention, the planet carrier is fixed in relation to the sun gear.

According to another characteristic of the invention, the annular tab includes an annular periphery and the orthogonal projection of the annular periphery being arranged radially outside the recovery chamber.

According to another characteristic of the invention, the gutter includes a second wall portion connected at one of its ends to the first wall portion and at another of its end to the recovery chamber, the inlet opening being arranged facing a part of the second wall portion.

According to another characteristic of the invention, the recovery chamber is arranged upstream of the annular tab of the outer ring gear, the first wall portion being connected to a third wall portion extending downstream of the annular tab.

According to another characteristic of the invention, the recovery chamber has a substantially U-shaped axial section in order to store a large quantity of oil and to prevent the oil from spilling into the turbomachine enclosure and in particular into the speed reducer installed in this enclosure with the gutter.

According to a characteristic of the invention, the gutter includes an annular retention wall secured to one of the side walls forming a branch of the U of the recovery chamber and bordering at least a portion of the inlet opening. Such a retention wall improves the retention of the recovery chamber and prevents the oil from overflowing from the recovery chamber.

According to a characteristic of the invention, the first wall portion is conical or frustoconical so as to facilitate the guidance of the oil to the recovery chamber and prevent the oil from being directed towards the reducer.

Advantageously, the first wall portion is arranged axially opposite the recovery chamber so as to facilitate the progression of the oil to the recovery chamber.

According to another characteristic, the gutter is provided with a radial axis outlet opening located in the lowest part of the speed reducer along the radial axis and oriented towards the outside of the speed reducer so as to allow the oil to drain from the gutter to the lower part of the enclosure.

In an advantageous but non limitative way, the gutter is made from a sheet metal. This makes it possible to have a light and economical gutter.

According to another characteristic, the recovery chamber is provided with a radially oriented inlet opening facing the gutter wall.

According to an embodiment of the invention, the gutter includes two axially opposed recovery chambers arranged on either side of the oil ejection means.

According to another embodiment of the invention, the oil ejection means have an angular orientation with respect to the radial axis, the orientation including an axial component along the longitudinal axis X towards the gutter. Such a configuration can prevent splashes on the gutter wall when the oil is ejected by centrifugation.

According to a characteristic of the invention, the outer ring gear is fixed on the rotor shaft by means of a flange which includes at least partly the oil ejection means through which the oil is ejected by centrifugal effect.

According to another characteristic, the flange is formed by an annular support secured with the rotor shaft and extending radially outwardly, and an annular tab of the outer ring gear which extends radially outwardly, the annular tab and the annular support being supported against each other, the ejection means including channels formed between the annular support and the annular tab.

According to another characteristic, the rotor shaft is a fan shaft.

According to a characteristic of the invention, the outer ring gear is monobloc.

According to another embodiment the invention, the outer ring gear is formed in two portions with a first ring portion and a second ring portion, and the flange is formed in three portions with a first annular tab portion extending radially outwardly and integral with the first ring portion, a second annular tab portion extending radially outwardly and integral with the second ring portion, and an annular support extending radially outwardly and integral with a rotor shaft, the oil ejection means including channels formed at least between the support, the first and second annular tab portions.

The invention also concerns a turbomachine including a rotor shaft with a longitudinal axis X, a power shaft and a power transmission system having any of the above-mentioned characteristics, between the rotor shaft and the power shaft, the oil recovery device being arranged to recover and contain the oil ejected by centrifugal effect from the speed reducer.

5. BRIEF DESCRIPTION OF THE FIGURES

The invention will be better understood, and other purposes, details, characteristics and advantages of the invention will become clearer when reading the detailed explanatory description that follows, of the embodiments of the invention given as purely illustrative and non-limiting examples, with reference to the attached schematic drawings in which.

Figure 2:
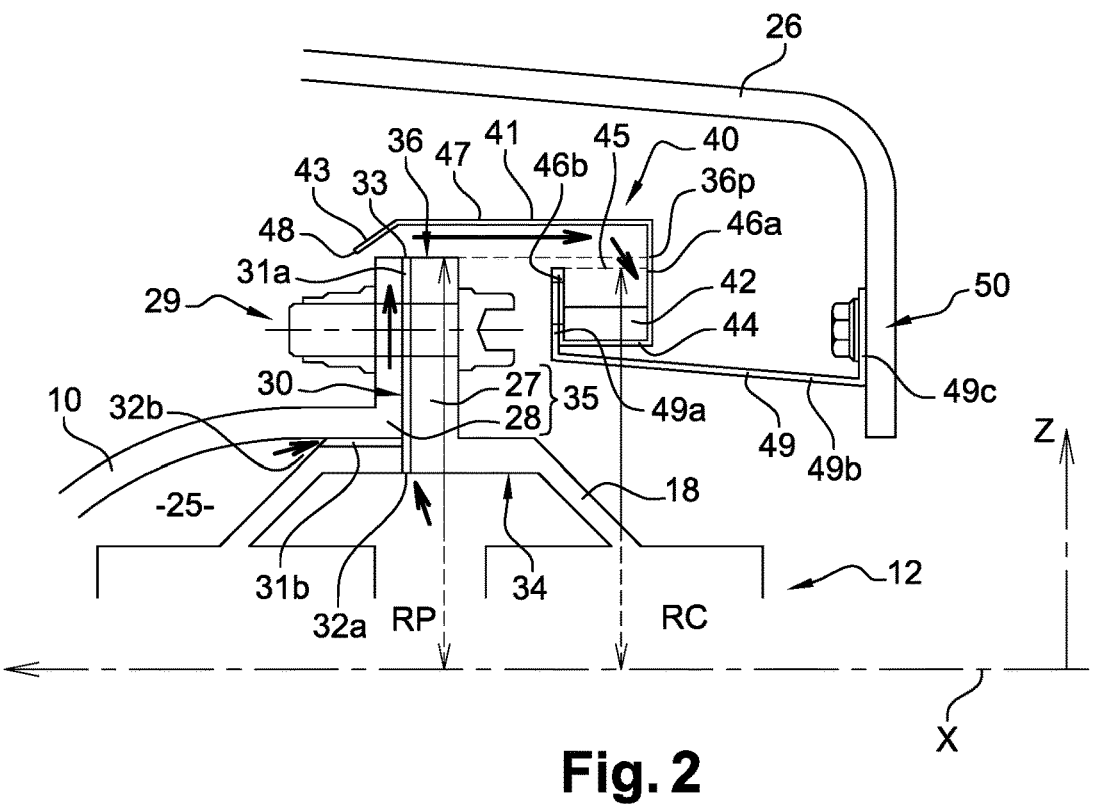
FIG. 2 is a schematic, axial and partial view of a gutter of a lubricant recovery device ejected from an outer ring gear of a planetary gear speed reducer according to the invention.
Figure 5:
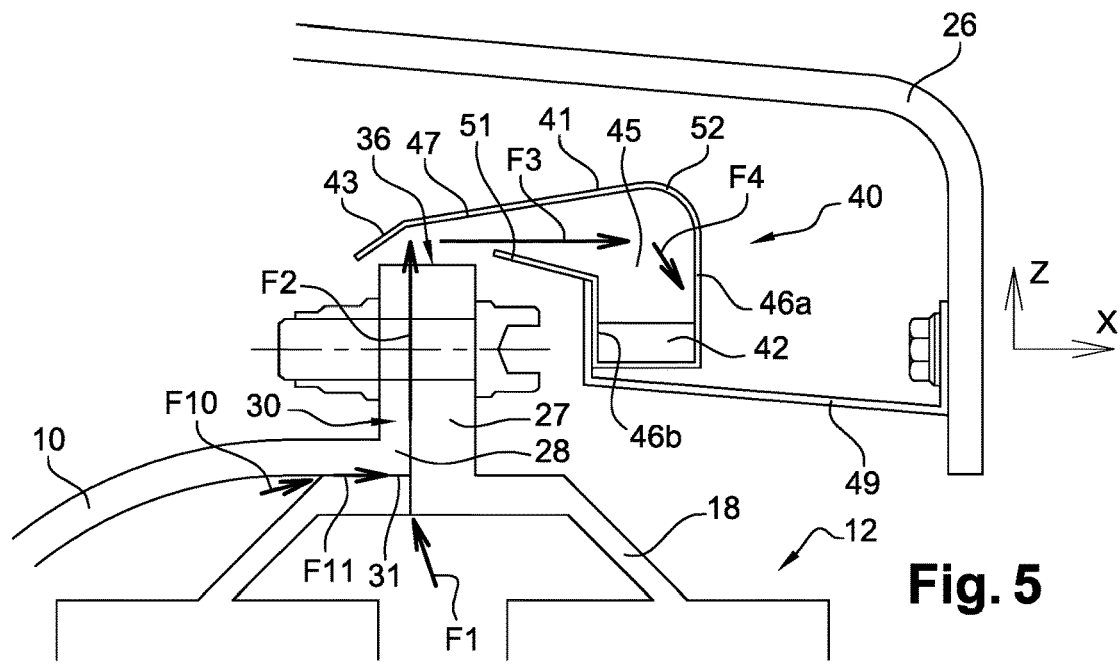
Figure 6:
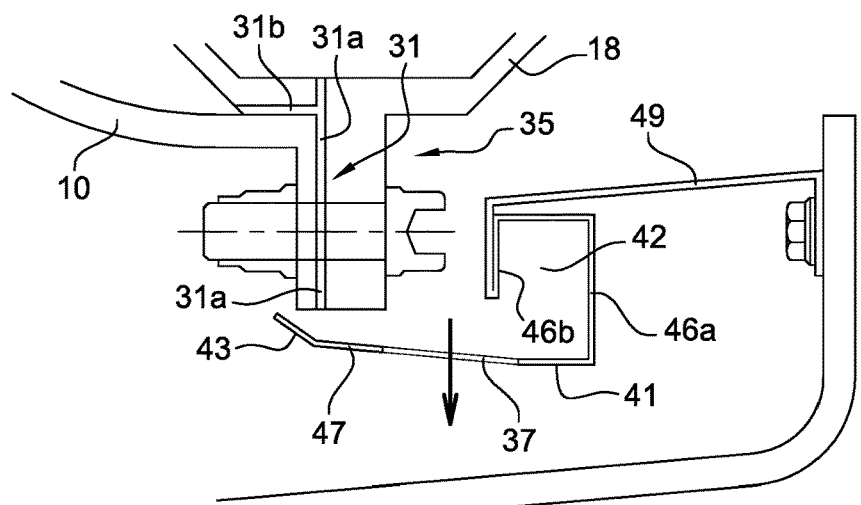
Figure 7:
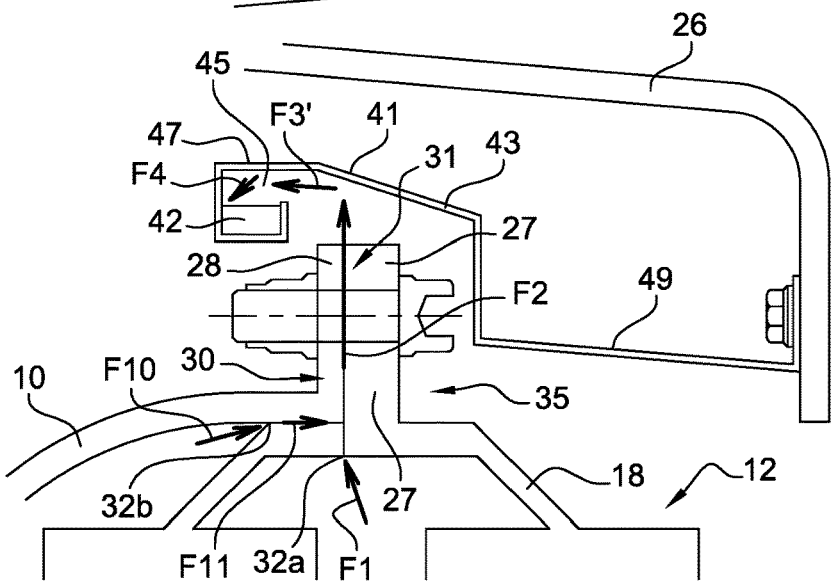
Figure 8:
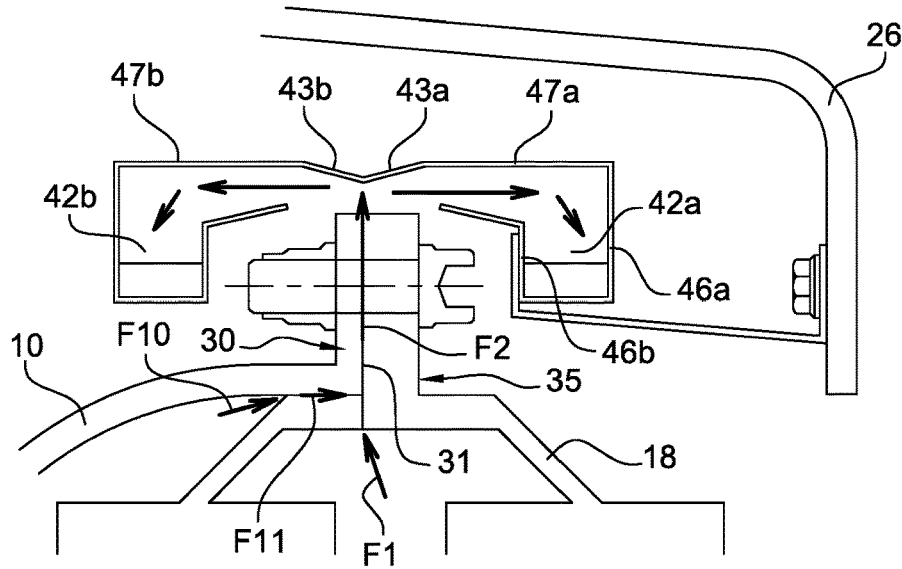
Figure 9:
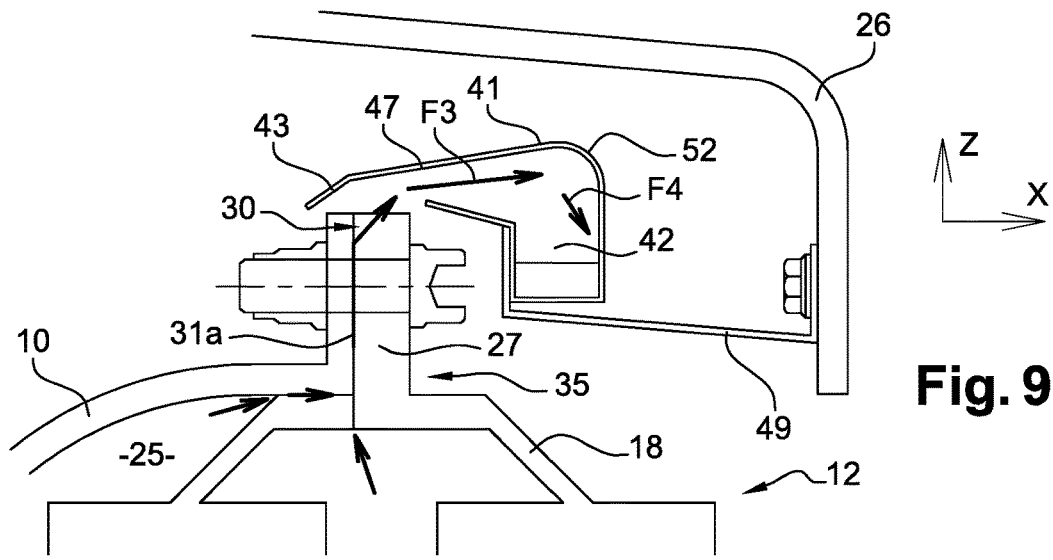
Figure 10:
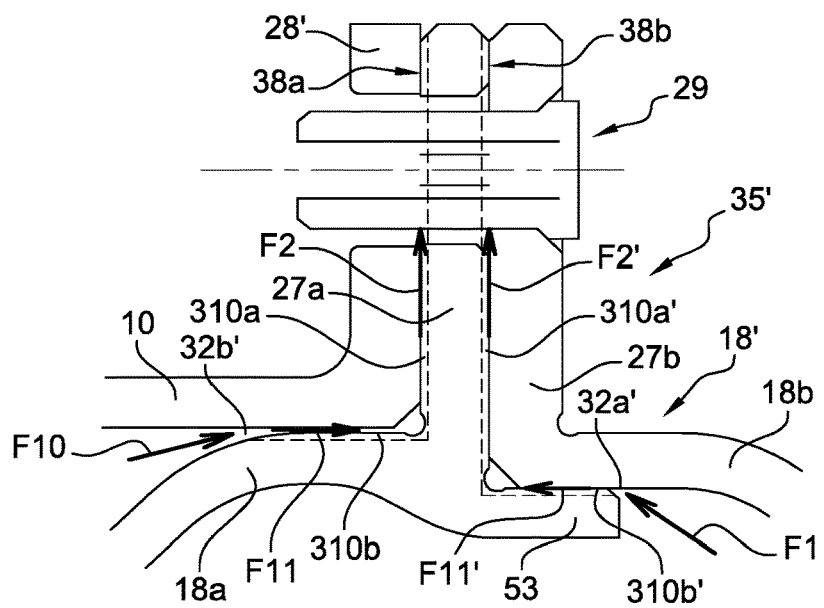

FIG. 5 schematically illustrates another variant of the gutter according to the previous figure in which a retention wall prevents the lubricant from overflowing from a gutter recovery chamber;

FIG. 6 shows the lower part of a gutter according to another variant of FIG. 2 with a wall that widens towards a recovery chamber;

FIG. 7 shows another embodiment in which a recovery chamber is arranged upstream of the gutter and a radially outer flange of the outer ring gear of the speed reducer;

FIG. 8 illustrates another embodiment of the invention with a gutter of a lubricant recovery device comprising two recovery chambers;

FIG. 9 illustrates another embodiment of the invention in which lubricant ejection means are oriented in a direction inclined with respect to a radial axis; and, FIG. 10 is an axial and partial cross-sectional view of a part of a speed reducer comprising ejection means with several channels for ejecting oil at the periphery of a flange of the speed reducer.

6. DESCRIPTION OF EMBODIMENTS OF THE INVENTION

Figure 1:
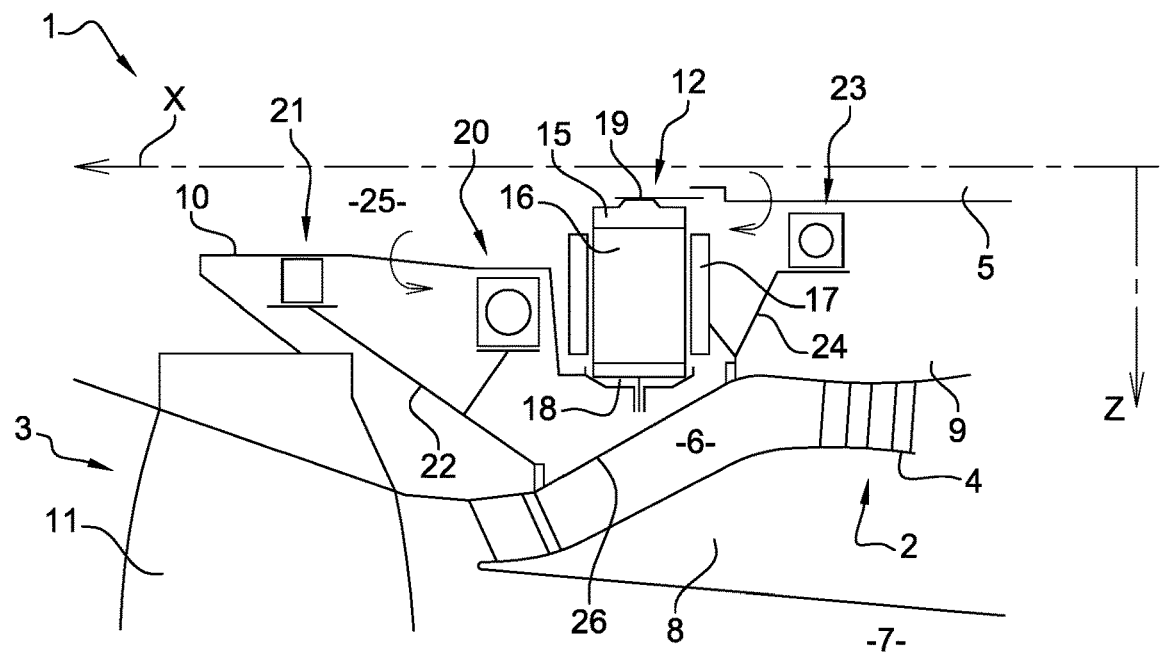
FIG. 1 shows an axial and partial section of a turbomachine including a fan module whose fan shaft is driven by a power shaft via a speed reducer installed in a lubrication enclosure.

FIG. 1 shows an axial and partial cross-sectional view of a turbomachine with a longitudinal axis X, in particular a dual flow turbine engine to which the invention applies. Of course, the invention is not limited to this turbomachine. It can be applied, for example, to a turbomachine comprising a pair of counter-rotating propellers rotating about a longitudinal axis and referred to as "open rotor" for non-enclosed propellers.

The dual flow turbine engine 1 generally includes an external nacelle (not shown) enclosing a gas generator 2 upstream of which is mounted a fan 3. In this invention, and in general, the terms "upstream" and "downstream" are defined in relation to the gas flow in the turbomachine which is substantially parallel to the longitudinal axis X. Similarly, the terms "radial", "internal", "external", "outer", "outward", "lower", "upper", "below" and "above" are defined with respect to a radial axis Z perpendicular to the longitudinal axis X and with respect to the distance from the longitudinal axis X. The gas generator 2 includes, for example, from upstream to downstream, a low-pressure compressor 4, a high-pressure compressor, a combustion chamber, a high-pressure turbine and a low-pressure turbine. The high-pressure compressor is connected to the high-pressure turbine via a high-pressure shaft to form a high-pressure body. Similarly, the low-pressure compressor 4 is connected to the low-pressure turbine via a low-pressure shaft 5 to form a low-pressure body. The low-pressure shaft 5 and the high-pressure shaft are centered on the longitudinal axis X.

The fan 3 is here enclosed by a fan housing (not shown) attached to the external nacelle. The fan 3 compresses the air entering the turbomachine which is divided into a primary flow flowing through a primary annular duct 6 which passes through the gas generator 2 and a secondary flow flowing through a secondary 7 annular duct around the gas generator 2. In particular, the primary 6 and the secondary duct 7 are separated by an inter-duct 8 annular housing surrounding the gas generator 2. The fan 3 consists of a series of blades 11, each extending radially outward and radially bounded by the fan housing.

The fan module is arranged upstream of an internal housing 9 of the turbomachine which is traversed by a rotor shaft 10, here the fan shaft which is centered on the longitudinal axis X. The fan shaft 10 is driven in rotation by a power shaft of the turbomachine via a power transmission mechanism of a power transmission system, allowing to reduce the rotation speed of the fan 3. This power shaft is the low pressure shaft 5 in this example. The power transmission mechanism allows the arrangement of a fan with a large diameter which results in an increase in the dilution ratio.

The power transmission mechanism includes a speed reducer 12, formed with a gear train known as a "Reduction Gear Box" (RGB). The speed reducer is here planetary. This includes, as shown schematically in FIG. 1, an inner sun gear referred to here as sun gear 15, planet gears 16, a planet carrier 17 and an outer sun gear referred to here as outer ring gear 18. In this example, the input of the speed reducer 12 is coupled to the low pressure shaft 5 while the output of the speed reducer 12 is coupled to the fan shaft 10.

The speed reducer 12 includes an input shaft 19, centered on the longitudinal axis X, rotationally fixed to the low-pressure shaft 5 and to the sun gear 15 along the longitudinal axis X. The outer ring gear 18, also centered on the longitudinal axis X, is fixed in rotation with the fan shaft 10 about the longitudinal axis X. Planet gears 16, for example, five in number, are carried by the planet carrier 17, which is fixedly mounted. The planet gears 16 each rotate about an axis substantially parallel to the longitudinal axis X. Each of the planet gears 16, in the form of a pinion, has teeth that mesh with those of the sun gear 15, in the form of a gear wheel, and with the outer ring gear 18 equipped with internal teeth. During operation, the sun gear 15 is driven in rotation by the low-pressure shaft 5 at a first rotational speed. The planet gears 16 are driven in rotation by the sun gear 15 around their axis at a second rotational speed. The outer ring gear 18, which meshes with planet gears 16, is driven in rotation about the longitudinal axis X and drives the fan shaft 10. The outer ring gear 18 rotates at a third speed and in a direction opposite to that of sun gear 15.

Alternatively, the speed reducer can be an epicyclic gear train differential speed reducer. In this case, the sun gear, planet gears, planet carrier and outer ring gear are all movable.

With reference to FIG. 1, first and second bearings 20 and 21 are used to support and guide the fan shaft 10 in rotation in order to support the radial and axial loads it is subjected to. These first and second bearings 20, 21 include rolling elements that are each mounted between a first and a second ring. Each first ring is mounted on the fan shaft 10 and each second ring is mounted on a ferrule 22. The rolling elements of the first bearing 20, mounted in the vicinity of the speed reducer 12, are balls here while the rolling elements of the second bearing 21 are rollers. The first and second bearings are mounted upstream of the speed reducer 12. More precisely, the second bearing 21 is mounted upstream of the first bearing 20. Similarly, a third bearing 23 is also provided to support and guide the low-pressure shaft 5 in rotation. This third bearing 23 is located downstream of the speed reducer 12. The third bearing 23 also includes an inner ring carried by the low-pressure shaft 5 and an outer ring carried by a downstream support 24.

The first, second and third bearings 20, 21, 23, as well as the gear wheels and pinions of the speed reducer 12 are contained in an annular lubrication enclosure 25 formed by one or more fixed housing(s) 26 of the turbomachine. The ferrule 22 and the downstream support 24 are fixed to the fixed annular housing 26. This fixed housing 26 being itself fixed to the internal housing 9 of the turbomachine. The enclosure 25 extends axially and radially on either side of the speed reducer 12. As shown in FIG. 1, this enclosure 25 is at least partially axially traversed by the fan shaft 10 and the low-pressure shaft 5.

In the enclosure 25 circulates a lubricant such as oil to continuously lubricate and cool the bearings and rotating parts of the speed reducer during operation of the turbomachine to ensure proper operation of the bearings and the speed reducer. For this purpose, a lubrication system (not shown) includes pipes that spray oil through the sun gear 15. The oil is injected into the rotating parts of the planet gears 16 and sun gear 15 and then the outer ring gear 18. The oil is then ejected outside the outer ring gear 18 by centrifugation using ejection means 30 shown in more detail in FIG. 2 and following. The oil is also injected at the first, second and third levels 20, 21, 23.

FIG. 2 shows an example of fixing between the fan shaft 10 and the outer ring gear 18 of the speed reducer 12 in the upper part of the latter (high point, at 12 o'clock). In this example, the ring gear 18 is monoblock (i.e. in one piece). In particular, the outer ring gear 18 includes an annular tab 27 extending radially outwardly. This includes at least part of the ejection means as described below. This annular tab 27 is fixed to an annular support 28 of the fan shaft 10 via fixing means 29 such as screws. The annular support 28 extends along the radial axis Z to a free end of the fan shaft 10. This support 28 is defined in a plane parallel or substantially parallel to the one in which the annular tab 27 is defined. The annular tab 27 and the support 28 form a flange 35. The oil is ejected from the outer ring gear 18 at this flange 35 via oil ejection means 30. Ejection means 30 here comprise one or more channels 31 which are evenly distributed at least over the circumference of the outer ring gear 18.

Advantageously but in a non-limiting manner, the first channels 31a extend substantially along the radial axis Z. Each first channel 31a extends radially between an inlet port 32a and an outlet port 33. The inlet port 32a is defined in an inner surface 34 of the outer ring gear 18 on which the inner teeth (not shown) are defined. As for the outlet orifice 33, it leads to the periphery of the flange 35 (annular periphery 36 of the annular tab 27 and that of the support 28 which are flush). Preferably, but not limited to, there are several outlet ports 33 distributed circumferentially over the periphery of the flange 35, and at least three outlet ports 33 are provided on the periphery of the flange 35. The oil flows from the inside of the outer ring gear 18 to the outside of it via channel(s) 31.

The oil flowing around the circumference of the outer ring gear 18 is also discharged between the fan shaft 10 and the outer ring gear 18, and in particular the flange 35, via the channel(s) 31. In an advantageous but not limited way, second channels 31b extend substantially along the longitudinal axis X. Each second channel 31b extends axially from an inlet port 32b and a first channel 31a. In other words, the second channels 31b lead to the first channels 31a.

The lubricating oil is expelled through channels 31 with a radial speed corresponding to the centrifugation exerted by the passage through the outer ring gear 18 and a tangential speed corresponding to the rotational drive at the third speed in the direction of rotation of the outer ring gear 18.

The power transmission system is completed by an oil recovery device 40 which is designed to quickly recover and evacuate the oil ejected by centrifugal effect into the turbomachine and in particular into the enclosure 25. This recovery device 40 includes an annular gutter 41 designed to recover the oil ejected from the speed reducer 12. The gutter 41, centered on the longitudinal axis X, is arranged around the outer ring gear 18. The gutter 41 is fixed on the fixed housing 26. The gutter 41 includes a recovery chamber 42 through which a large quantity of oil passes before it is evacuated to the lower part of the enclosure 25. The size of the recovery chamber allows the oil to be temporarily accumulated or stored in order to limit overflows. The gutter 41 also includes a first wall portion 43 arranged at least partially facing the oil ejection means 30, here channels 31, 31a, 31b and configured so as to direct the oil projected by centrifugation onto it towards the recovery chamber 42.

As shown in FIG. 2, recovery chamber 42 is located downstream of gutter 41, and here downstream of flange 35. The recovery chamber 42 is open. The chamber is oriented substantially radially outwardly. In particular, the recovery chamber 42 has a substantially U-shaped axial section with a bottom 44, an inlet opening 45 radially opposite the bottom 44, first and second side walls 46a, 46b (with respect to the longitudinal axis X). The side walls 46a, 46b each form a branch of the U. The inlet opening 45 is oriented radially outwardly. The first wall portion 43 is located facing the flange 35. In other words, the wall 43 is located radially at a distance from the ring gear (and the annular tab, or even the flange 35). This one is connected to a second wall portion 47 which is connected to one of the side walls 46a, 46b of the recovery chamber 42 (here the first side wall 46a). The second wall portion 47 extends substantially along the longitudinal axis X with a part facing the ejection means and the outer ring gear 18. As can also be seen in FIG. 2, the inlet opening 45 is arranged facing the gutter wall 41 (and in particular part of the second wall portion 47). The bottom 44 of recovery chamber 42 is oriented towards the outer ring gear 18. The connection between the second wall portion 47 and the first side wall 46a is here approximately at a right angle.

The first wall portion 43 has a conical or frustoconical axial section so that the oil is diverted to the recovery chamber 42, in this example downstream of gutter 41. In other words, the first wall portion 43 conical or frustoconical is arranged axially opposite the recovery chamber 42.

The oil projected on the first wall portion 43 progresses along the second wall portion 47 towards the inlet opening 45 of recovery chamber 42. A free end 48 of the first wall portion 43 is oriented towards the inside of the turbomachine (towards the speed reducer 12). The free end 48 is located upstream of flange 35 and in particular upstream of the annular support 28 of fan shaft 10. The oil cannot therefore be sprayed beyond the free end 48, towards the enclosure 25.

In addition, the gutter 41 includes a third wall portion 49 that is attached to the fixed housing 26 by fastening devices 50 such as bolts or screws. The third wall portion 49 is coupled to one of the side walls 46a, 46b of the recovery chamber. In the example shown, the third wall portion 49 is attached to the second side wall 46b adjacent to the annular tab 27 of the outer ring gear 18. We also see that the third wall portion 49 has a first radial portion 49a which is attached to the second side wall 46b and a second portion 49b which extends radially below the bottom 44 of the recovery chamber 42. At its downstream end an annular collar 49c with a radial axis Z is fixed on the fixed housing 26.

In order to reduce the radial space requirement of the gutter, the inlet opening 45 is defined in the same plane or in a substantially lower plane in which the outlet port 33 of the ejection means is defined, here channels 31 and outlet ports 33. Recovery chamber 42 does not extend beyond outlet port 33 of the channels. In other words, the RC radius of recovery chamber 42 is equal to or less than the external radial height (radius RP) of annular tab 27 or flange 35. The radius RP is defined as the distance between the longitudinal axis X and the annular periphery 36 of the annular tab 27 or the flange 35 while the radius RC of the recovery chamber 42 is considered as the distance between the longitudinal axis X and the inlet opening 25. The recovery chamber 42 has a height along the radial axis that is substantially equal to or lower than that of annular tab 27. We can also say, in the context of FIG. 2, that the orthogonal projection of the annular periphery 36 (of the annular tab 27) on the side wall 46a of the recovery chamber 42 forms a line at point 36P that is arranged radially outside the recovery chamber. Similarly, the flange 35 is located radially inside the gutter 41.

Figure 3:
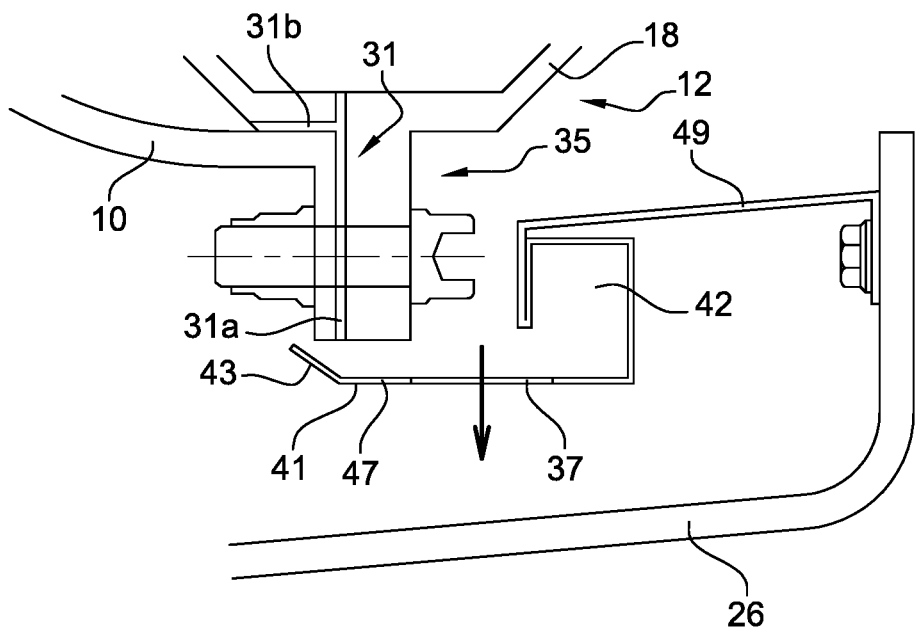
FIG. 3 shows the lower part of the gutter of the recovery device shown in FIG. 2.

In FIG. 3, the gutter 41 is also equipped with an outlet port 37 with a radial axis oriented towards the inside of the turbomachine. Of course, the recovery chamber can include several outlet ports 37. Each outlet port 37 is formed in the second wall portion 47 of the gutter. As shown in FIGS. 3 and 6, the outlet port 37 is located at least partially with respect to recovery chamber 42. The oil is evacuated from the lower part of the gutter 41 (i.e. outside the speed reducer) and toward the lower part of the enclosure 25 at six o'clock to return to the lubrication circuit of the lubrication system.

The gutter 41 is made of a metallic material. In an advantageous way, but not limited to, the gutter 41 is made from a sheet metal to lighten the weight of the latter. The walls 43, 44, 47, 46a, 46b, 49 are obtained by bending or welding. Bending and welding are easy and quick to implement and require very little tooling to manufacture the gutter.

Figure 4:
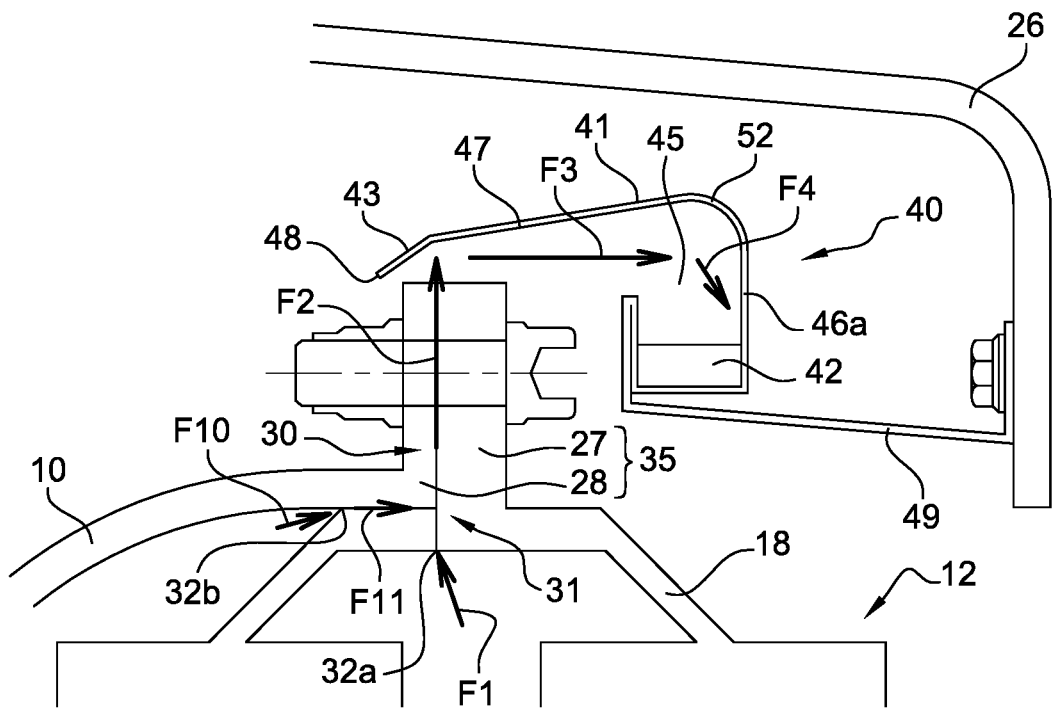
FIG. 4 shows a variant of FIG. 2 with a gutter with a curved or bent wall portion.

FIG. 4 illustrates a variant of the embodiment described above. The gutter 41 of this variant is substantially identical to the one described in FIGS. 2 and 3 except for the configuration of the second wall portion 47 of the gutter. Indeed, in this example, the second wall portion 47 has a conical or frustoconical axial section. Its upstream end, integral with the first wall portion 43, is oriented towards the inside of the turbomachine. In other words, the second wall portion 47 widens downstream. The second wall portion 47 includes an angled portion 52 that connects to the first side wall 46a of recovery chamber 42 to optimize oil flow toward the recovery chamber 42.

During operation, the oil passes through the speed reducer and is ejected by centrifugal effect from the outer ring gear 18 by penetrating through the inlet port or ports 32a according to arrow F1. The oil surrounding the speed reducer also progresses on the periphery of the outer ring gear 18 by centrifugal effect to enter the inlet port 32b following the arrow F10. The oil then progresses through channels 31 which are formed between the walls of fan shaft 10 and outer ring gear 18 according to arrows F2 and F11 until it is projected onto the first wall portion 43 of gutter 41. The oil then flows along the second wall portion 47 following the arrow F3 towards the inlet opening 45 of recovery chamber 42. Finally, it enters the recovery chamber 42 following arrow F4.

FIG. 5 also shows another embodiment of the gutter 41, according to the invention. In this variant, the second wall portion 47 has a conical or frustoconical axial section and the bent or elbowed portion 52 downstream of the gutter 41 as described in FIG. 4. In this example, the gutter 41 includes an annular retention wall 51 that is attached to the second side wall 46b of the recovery chamber 42 to improve its retention. The retention wall 51 borders the inlet opening 45 of recovery chamber 42. In addition, the retention wall 51 has an inclination with respect to the radial axis Z. This is particularly oriented towards the upstream side of the gutter, i.e. towards the first wall portion 43 of the gutter 41. This retention wall is formed by bending or attaching and then welded to the second side wall 46b. The oil is sprayed from channels 31 to gutter 41 and then into the recovery chamber 42 of the latter following the same path described in relation to FIG. 4.

FIG. 7 illustrates another embodiment in which the recovery chamber 42 is located upstream of the gutter 41. More precisely, the recovery chamber 42 is located upstream of the annular support 28 of the fan shaft 10 and upstream of the oil ejection means 30 including the channels 31. The first wall portion 43, axially opposite the recovery chamber 42, is arranged facing the oil ejection means 30 and surrounds the oil ejection means. In this example, the third wall portion 49, attached to the fixed housing 26, is connected to the first wall portion 43 conical or frustoconical. This third wall portion 49 extends downstream of the annular tab 27 of the outer ring gear 18. In this embodiment, the oil passes through the speed reducer and is ejected by centrifugal effect from the outer ring gear 18 by entering through the inlet port or ports 32a according to arrow F1. The oil surrounding the speed reducer also progresses on the periphery of the outer ring gear 18 by centrifugal effect to enter the inlet port 32b following the arrow F10. The oil then progresses through channels 31 which are formed between the walls of fan shaft 10 and outer ring gear 18 according to arrows F2 and F11 until it is projected onto the first wall portion 43 of gutter 41. The oil then flows along the second wall portion 47 following the arrow F3' towards the inlet opening 45 of the recovery chamber 42. Finally, it enters the recovery chamber 42 following the arrow F4.

Another embodiment is also illustrated in FIG. 8. In this example, the gutter 41 includes two axially opposed recovery chambers 42a, 42b arranged on either side of the oil ejection means 30. These recovery chambers 42a, 42b each have smaller dimensions than the previous embodiments, which also reduces the radial size. In this case, the gutter 41 includes two first portions 43a, 43b of conical or frustoconical wall facing the oil ejection means 30. These form a V whose apex is oriented towards the ejection means 30. Each of the first wall portions 43a, 43b guides the oil to a recovery chamber 42a, 42b. Advantageously, but not exclusively, each first wall portion 43a, 43b widens respectively towards the corresponding recovery chamber 42a, 42b in which the oil is diverted. Each first wall portion 43a, 43b is connected to a side wall of the recovery chamber via a second wall portion 47a, 47b. In this example, the second wall portions 47a, 47b extend along the longitudinal axis but these can of course widens towards a recovery chamber (conical or frustoconical section) as shown in FIGS. 4 and 5. The side wall 46a can connect the second wall portion 47b with a bent portion 52 or with a right angle. When the oil is sprayed onto the first wall portion 43a (downstream of flange 35 on FIG. 8), the oil is directed towards the recovery chamber 42a (downstream of the flange 35) along the second wall 47a. The oil sprayed on the first wall portion 43b is directed to the recovery chamber 42b (upstream of the flange 35) in the same way.

FIG. 9 illustrates a variant of the gutters described in relation to FIGS. 2 to 8. In this example, the ejection means 30 have at least one portion with an angular orientation with respect to the radial axis Z. In particular, each ejection channel 31a of ejection means 30 has a portion that is inclined at an angle of about 45° with the radial axis Z and is oriented towards the second wall portion 47. Advantageously, each channel 31a is oriented (towards the outer radial end of the channel 31a) towards the recovery chamber 42 depending on whether the latter is upstream or downstream of the ejection means 30 or flange 35 to avoid oil splashes in the gutter and enclosure 25. In this example, the oil is sprayed directly onto the second wall 47 (arrow F3) and then progresses along it until it reaches the recovery chamber (arrow F4). The first wall portion 43 also allows any oil splashes to be directed towards the recovery chamber 42.

Following another embodiment illustrated in FIG. 10, the outer ring gear 18' is formed in two portions. This means that it is no longer monoblock as shown in FIGS. 2 to 9. The annular tab carried by the outer ring gear 18' is also made in two portions. In other words, the flange 35' is made up of three portions (support and two-part annular tab). Such a configuration makes it even easier to manufacture the ring gear and to facilitate oil recovery. Indeed, the outer ring gear 18' includes a first ring portion 18a which is provided with a first annular tab portion 27a. The latter extends radially outwardly. The ring gear includes a second ring portion 18b which is equipped with a second annular tab portion 27b. The second portion of the annular tab 27b extends radially outwardly. The first ring portion includes an annular protrusion 53 that extends along the longitudinal axis from the inner radial end of the first annular tab portion 27a. The projection 53 is arranged radially below the second annular tab portion 27b and a portion of the second ring portion 18b. In other words, the second portion of the annular tab 27b rests on the projection 53. The first ring portion 18a is arranged axially between the fan shaft 10 and the second ring portion 18b. Similarly, the first annular tab portion 27a is arranged axially between the annular support 28' of the fan shaft 10 and the second annular tab portion 27b. First channels 310a are formed between the radial face of the support 28 and a first radial wall 38a of the first annular tab portion 27a. Each first channel 310a is connected to a second channel 310b formed on the circumference of the first ring portion 18a.

First channels 310a' are also formed between a second radial wall 38b of the first annular tab portion 27a and the radial surface of the second annular tab portion 27b. The first and second radial walls 38a, 38b are axially opposed to each other. Each first channel 310a' is connected to a second channel 310b' formed on the circumference of the first ring portion 18b (especially on the circumference of the projection 53). In this way, the oil passes through the speed reducer 12 and is ejected by centrifugal effect from the outer ring gear 18' by penetrating through the inlet port or ports 32a' according to arrow F1. The oil surrounding the speed reducer also progresses on the periphery of the outer ring gear 18' by centrifugal effect to enter the inlet 32b' port according to arrow F10. The oil then progresses through the second channels 310b, 310b', then through the first channels 310a, 310a' which are formed between the walls of the fan shaft 10 and the first and second annular tab portions 27a, 27b of the outer ring gear 18' according to arrows F11, F11', F2, F2' until it is projected onto the gutter 41 then into a recovery chamber 42 or into two recovery chambers 42a, 42b.

Thus, with a gutter of this type, the radial and possibly axial sizes in the turbomachine are reduced, in particular with an outer ring gear 18, 18' rotating in relation to a fixed housing, so as not to impact the mass of the latter. The recovery chamber 42, 42a, 42b allows a total recovery of the centrifuged oil through the outer ring gear 18, 18' of the speed reducer 12.

The invention claimed is:
1. A power transmission system of a turbomachine between a rotor shaft with a longitudinal axis X and a power shaft with a longitudinal axis X, the transmission system including:
   a speed reducer capable of reducing the speed of the rotor shaft, said speed reducer including a sun gear configured to be rotationally secured with the power shaft, an outer ring gear configured to drive in rotation by the rotor shaft along the longitudinal axis X, and a planet carrier, and
   a device for recovering oil ejected by centrifugal effect into the turbomachine, the recovery device including an annular gutter intended to recover the oil ejected from the speed reducer, the gutter being configured to be secured to a fixed annular housing surrounding said gutter and including a recovery chamber and a first wall portion disposed at least partially facing oil ejection means of the speed reducer so as to direct the oil projected thereon toward the recovery chamber,
   characterized in that the outer ring gear includes an annular tab extending outwardly along a radial axis Z perpendicular to the longitudinal axis X and including at least in part the ejection means ejecting the oil from the outer ring gear and in that the recovery chamber is provided with an inlet opening directed radially outwardly and defined in a plane radially lower than a plane in which is defined an outlet port which includes the ejection means.

2. The power transmission system according to claim 1, wherein the outer ring gear comprises an annular periphery and the orthogonal projection of the annular periphery is arranged radially outside the recovery chamber.

3. The power transmission system according to claim 1, wherein the recovery chamber is arranged upstream of the annular tab of the outer ring gear, the first wall portion being connected to a third wall portion extending downstream of the annular tab.

4. The power transmission system according to claim 1, wherein the recovery chamber has a substantially U-shaped axial section.

5. The power transmission system according to claim 4, wherein the recovery chamber includes an annular retention wall secured to one of the side walls forming a branch of the U of the recovery chamber and bordering at least a portion of the inlet opening.

6. The power transmission system according to claim 1, wherein the first wall portion has a conical or frustoconical axial section.

7. The power transmission system according to claim 1, wherein the first wall portion is arranged axially opposite the recovery chamber.

8. The power transmission system according to claim 1, wherein the gutter is provided with a radial axis outlet opening located in the lowest part of the speed reducer along the radial axis and oriented towards the outside of the speed reducer.

9. The power transmission system according to claim 1, wherein the gutter is made from a sheet metal.

10. The power transmission system according to claim 1, wherein the gutter includes two axially opposed recovery chambers and arranged on either side of the oil ejection means.

11. The power transmission system according to claim 1, wherein the oil ejection means have an angular orientation with respect to the radial axis, the orientation including an axial component along the longitudinal axis towards the gutter.

12. The power transmission system according to claim 1, wherein the outer ring gear is fixed on the rotor shaft by means of a flange which includes at least in part the oil ejection means through which the oil is ejected by centrifugal effect.

13. The power transmission system according to claim 12, wherein the flange is formed of an annular support secured with the rotor shaft and extending radially outwardly and the annular tab of the outer ring gear, the annular tab and the annular support being in support of each other, the ejection means including channels formed between the annular support and the annular tab.

14. The power transmission system according to claim 1, wherein the outer ring gear is formed in two portions with a first ring portion and a second ring portion, and the flange is formed in three portions with a first annular tab portion extending radially outwardly and integral with the first ring portion, a second annular tab portion extending radially outwardly and integral with the second ring portion, and an annular support extending radially outwardly and integral with the rotor shaft, the oil ejection means including channels formed at least between the annular support, the first and second annular tab portions.

15. A turbomachine including a rotor shaft, a power shaft and a power transmission system according to claim 1, between the rotor shaft and the power shaft, the recovery device being arranged to recover the oil ejected by centrifugal effect from the speed reducer.

* * * * *